United States Patent [19]
Zeman et al.

[11] Patent Number: 5,144,893
[45] Date of Patent: Sep. 8, 1992

[54] SAFE ORDNANCE INITIATION SYSTEM

[75] Inventors: Samuel Zeman; Robert E. Betts, both of Huntsville, Ala.

[73] Assignee: The United States of America as represented by the Secretary of the Army, Washington, D.C.

[21] Appl. No.: 741,001

[22] Filed: Aug. 6, 1991

[51] Int. Cl.[5] .......................... F42B 3/14; F42C 19/12
[52] U.S. Cl. .................. 102/202; 102/202.8; 102/202.9; 102/275.5; 102/275.11
[58] Field of Search .................. 102/202, 202.5, 202.6, 102/202.7, 202.8, 202.9, 202.11, 202.14, 275.6, 275.11

[56] References Cited

U.S. PATENT DOCUMENTS

| | | | |
|---|---|---|---|
| 2,891,477 | 6/1959 | Swanson | 102/202.6 |
| 3,125,954 | 3/1964 | Vilbajo | 102/202.8 |
| 3,264,990 | 8/1966 | Betts | 102/202.7 |
| 3,298,306 | 1/1967 | Purdy | 102/202.8 |
| 3,308,758 | 3/1967 | Stadler et al. | 102/202.8 |
| 3,590,739 | 7/1971 | Per-Anders Persson | 102/275.5 |
| 4,727,808 | 3/1988 | Wong et al. | 102/202.5 |
| 4,862,803 | 9/1989 | Nerheim et al. | 102/202.7 |
| 4,878,430 | 11/1989 | Senkowski et al. | 102/202.9 |
| 4,924,774 | 5/1990 | Lenzen | 102/202.7 |
| 5,029,529 | 7/1991 | Mandigo et al. | 102/202.9 |
| 5,052,301 | 10/1991 | Walker | 102/202.7 |

*Primary Examiner*—David H. Brown
*Attorney, Agent, or Firm*—Hugh P. Nicholson; Freddie M. Bush

[57] ABSTRACT

A safe ordnance initiation system which is safe for normal handling, exposure to strong electromagnet fields, and electrostatic discharge comprises a firing circuit which provides a method for rapidly and efficiently connecting (switching) a charged capacitor to an electrical discharge inititation element; an enclosed and environmentally protected electrical discharge initiation element which provides a means of rapidly dissipating the capacitor charge and converting it to a shock wave and thermal/plasma energy output; a transmission line shock tubing which is connected to the electrical discharge initiation element at one end which is terminated in a target element at the other end thereof; and a target element having the capability for interacting with a predetermined output energy level of shock charge and thermal/plasma energy transmitted through the transmission line shock transfer tube to achieve a desired result for igniting or detonating the target element depending on the type of end termination employed for an ordnance initiating system.

5 Claims, 1 Drawing Sheet

SAFE ORDNANCE INITIATION SYSTEM

DEDICATORY CLAUSE

The invention described herein may be manufactured, used, and licensed by or for the Government for governmental purposes without the payment to us of any royalties thereon.

BACKGROUND OF THE INVENTION

Common practice in ordnance systems is the desirable employment of squibs, detonators and other electroexplosive devices to provide the thermal and/or shock stimulus that causes ignition or explosion of adjacent pyrotechnics or explosives. Such materials are frequently used in a train or in series of events that ultimately provides ignition of rockets for military or space applications. Electroexplosive devices commonly employ a metal wire filament surrounded by pyrotechnics or explosive materials. Upon application of voltage, the filament is heated or caused to vaporize (even with explosive violence, depending on firing circuit employed) and the immediately surrounding material is ignited, or caused to explode or detonate. This output either directly ignites the next element in the ignition train or leads to the formation of a shock wave that initiates detonation.

However, electroexplosive devices are generally vulnerable, in various degrees, to electromagnetic radiation fields, electrostatic discharge, cookoff, impact, and other extraneous energy sources that can directly or indirectly initiate the active chemical material in direct contact with, or in the immediate vicinity of the metal wire filament or bridgewire. For example, handling of certain rocket weapons on Navy ships is prohibited when their high powered radar equipment is turned on, because of extreme vulnerability of the squibs in the igniters.

Thus, the current state of the art method of providing electrical initiation of igniters containing explosives inherently include various degrees of vulnerability which must be considered in the environment of use.

Desirable would be a device which is very safe for normal handling, exposure to strong electromagnetic fields, and electrostatic discharge, and yet a device which has the capability to initiate rocket igniters and other ordnance. Very desirable would be a device which does not contain any explosive or pyrotechnic material, but which has the capability to initiate rocket igniters and other ordnance.

The primary object of this invention is to provide a device which does not contain any explosive or pyrotechnic material but a device which has the capability to initiate rocket igniters and other ordnance.

Another object of this invention is to provide a device which functions in conjunction with a small diameter nonelectric shock transfer tube to produce shock waves which are normally produced by explosive percussion primers, blasting caps, detonators, or brisant squibs for initiating rocket igniters and other ordnance.

SUMMARY OF THE INVENTION

A safe ordnance initiation system comprising: (i) a firing circuit to provide the charged energy needed; (ii) an electrical discharge initiation element; (iii) a transmission line shock transfer tubing; and (iv) a target such as a rocket igniter including various end termination elements, or other ordnance items of an ignition train.

The firing circuit may contain numerous components and features based on input/output requirements. Basically, the firing circuit provides a method to charge a storing capacitor to a preselected voltage and a means for rapidly and efficiently connecting (switching) the charged capacitor to an electrical discharge initiation element. The electrical discharge initiation element provides a means of rapidly dissipating the capacitor charge and converting it to a shock wave and thermal/plasma energy input that propagates into and through an adjacent transmission line shock tubing. The transmission line shock tubing consists of a hollow tube which can optionally contain a very small amount of secondary explosive coating on its inside wall. As an example, one type of shock tube may have an inside diameter less than 0.050 inches and an outside diameter of nearly 0.125 inches with lengths of several feet to hundreds of feet per application. The target of the shock tube output varies with the end item application. The target may consist of an igniter such as a rocket igniter containing various pyrotechnics, including $B/KNO_3$, $Al/KClO_4$, black powder, single or double base propellant, composite propellant or numerous other deflagrating materials or the target may be an explosive charge that is to be detonated.

DESCRIPTION OF THE PREFERRED EMBODIMENT

Figure 1:
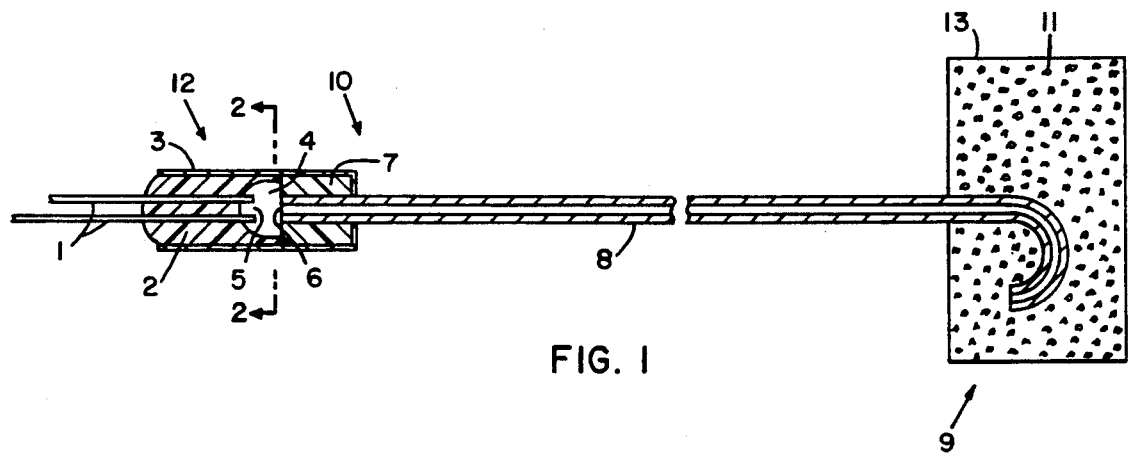
FIG. 1 depicts a safe ordnance initiation system 10 and associated components including an electrical discharge initiation element, a transmission line shock transfer tubing, and a target for receiving the shock or detonation wave from the shock transfer tubing.

In further reference to the Figures of the Drawing, the safe ordnance initiation system 10, as illustrated in FIG. 1, comprises the electrical discharge initiation element 12, the transmission line shock transfer tubing element 8, and the target element 9 in igniter container 13. The electrical discharge initiation element 12 comprises a pair of electrical conductors 1, an insulator 2 for separating the conductors, a cover or case 3 to provide structure support for several components and environmental protection to air gap 4 and spark gap 5. Spark gap 5 has a graphite coating on the insulator surface between the two conductors and can include an optional bridgewire attached to the conductors. The importance of providing protection and control to air gap 4 and spark gap 5 will be more fully appreciated from the ongoing disclosure. Element 6 is a thin cover or diaphragm of plastic or paper which is easily ruptured upon activation of electrical discharge initiation element 12. Element 7 is a retainer or spacer used to couple the shock transmission line shock transfer tubing element 8 to the electrical discharge initiation element 12. The transmission tube is shown extending into an end target 9 containing pyrotechnic material 11 to be ignited.

Figure 2:
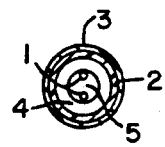
FIG. 2 depicts a view of the portion of the safe ordnance initiation system along line 2—2 of FIG. 1.

FIG. 2 depicts a view of selected items of the electrical discharge initiation element 12 taken along line 2—2 of FIG. 1.

Figure 3:
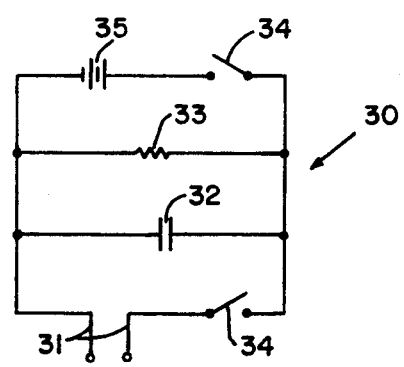
FIG. 3 depicts a firing circuit for connecting to electrical conductor element 1 of FIG. 1.

FIG. 3 depicts a firing circuit 30 comprising conductor leads 31 for connecting to electrical conductors 1 of element 12. The firing circuit additionally comprises a capacitor 32, resistor element 33, switching element or means 34, and a power source 35.

The firing circuit broadly illustrated above may contain numerous components and features depending primarily on input/output requirements. However, it basically provides a method of charging a storage capacitor to a preselected voltage and a means for rapidly and efficiently connecting (switching) the charged capacitor to the electrical discharge initiation element. The circuit inductance, capacitance, voltage, output cabling, distance between the capacitor and discharge element and other factors determine the efficiency and degree of energy transfer from the capacitor. Ideally, the firing circuit and charged capacitor should be in close proximity to the discharge element. In general, the electrical energy is provided from a circuit containing a capacitor, that can be charged to a voltage level high enough to produce the initiating shock wave.

Several variations of the methods of providing electrical initiation of transmission line shock tube are suggested as follows:

(1) A spark gap in which two conductors are separated by an air gap;

(2) A combination spark gap and semiconductor in which a semiconductor such as graphite is coated on the surface of an insulator separating two conductors;

(3) Two conductors connected by a thin filament of metallic wire that can be rapidly vaporized;

(4) Two conductors separated by a semiconductor wafer containing materials such as graphite, silicon, or combinations of rare earth compounds which are vaporized to form a plasma by rapid passage of electrical energy;

(5) Two or more conductors connected by a metal foil or vapor deposited metallic or semiconductor film that is vaporized with explosive violence upon passage of a high electrical current;

(6) Two or more conductors connected by metal foil which is covered with a thin layer of inert plastic or inorganic material and having a cylindrical section of strong inert material on top of this layer. Upon passage of high electrical current the metal foil explodes, causing a small fragment of the covering material to fly through the cylinder and be directed into the transmission line shock tube causing it to be initiated; and, (7) Combinations of the above.

Additional descriptive information is set forth hereinbelow for the electrical discharge initiation element 12, the shock transmission tube 8, and target 9 of FIG. 1 which depicts the safe ordnance initiation system 10.

The electrical discharge initiation element provides a means of rapidly dissipating the capacitor charge and converting it to a shock wave and thermal/plasma energy input that propagates into and through the adjacent transmission line shock tubing. Since this item does not contain any explosives or chemical combustibles in it (or around its exterior), it is completely safe to such electromagnetic radiation, electrostatic discharge, and other spurious sources of energy capable of inadvertently initiating conventional electroexplosive devices.

Transmission line shock tubing consists of a hollow tube which can have an optional, very small amount of a secondary explosive coated on its inside wall for certain end uses. The diameter of the plastic tubing is extremely small compared to its operational length. For example, one type of shock tube may have an inside diameter less than 0.050 inches, an outside diameter of nearly 0.125 inches and may be used in lengths of several feet to hundreds of feet per application. A key factor associated with the shock transfer tubing is that it does not rupture as a result of transfer of a pressure, shock or detonation wave, appropriately initiated. Therefore, the shock tubing can be routed through areas containing delicate equipment.

Applicants disclosed the use of a transmission line explosive (TLX) shock tube in a laser actuated thru-bulkhead initiator in their copending, commonly assigned patent application, titled: "Laser Actuated Thru-Bulkhead Initiator", Ser. No. 07/648,560, filed: Jan. 28, 1991.

The target of the shock tube output varies with the end item application. For example, TLX or Nonel (Nonel is a registered trademark of Nitro Nobel, Nora, Sweden) shock tubing can directly ignite typical powdered or granular pyrotechnic mixtures such as boron/potassium nitrate ($B/KNO_3$). To ignite pyrotechnic materials in the form of pressed pellets and ignition mixtures less ignitable than $B/KNO_3$, the shock tube (output end) may be coupled or mated to ignition transmission line, such as ITLX. The latter contains a pressed or extruded pyrotechnic material that provides a thermal output over an extended time. Alternately, an end termination containing a small amount of secondary explosive can be fitted to the shock tubing and render it capable of transferring detonation to subsequent items in an ordnance train. Therefore, transmission line shock tubing initiated with a non-explosive electrical discharge element can result in either an ignition or detonation output, depending on the type of end termination employed.

Additionally, the area in which the shock wave originates might also contain insulating or conductive materials (liquids, solids or gases) to achieve voltage holdoff, more reproducible breakdown voltage, a source of additional gas for pressurization, or other enhancing effects. However, these materials will not be explosives or pyrotechnics per se, since that would defeat the safety advantages otherwise obtained.

The chamber or area where the shock wave originates (e.g. the spark gap surroundings), as well as the electrodes or terminals may be advantageously designed to focus and/or reflect shock waves into the shock transfer tube for more efficient propagation. For example, the terminals can be bent toward each other, or be geometrically arranged in coaxial fashion to obtain a directional shock output. U.S. Pat. No. 3,264,990 issued to Robert E. Betts on Aug. 9, 1966, and assigned to the United States of America as represented by the Secretary of the Army, teaches a focused exploding bridge wire to a predetermined point or zone by means integral with the bridge wire.

Also, although the shock tube maintains its physical integrity during passage of a pressure of detonation wave, the junction or interface between the shock tube and the initiating device may be vulnerable to damage (rupture) during the initiating period. Therefore, one or more vents may be employed if needed, at the spark gap/shock tube interface to bleed off excess gas.

Furthermore, although the preferred concept is to employ the electrical discharge initiation element together with an active transmission line shock tube (which contains a small amount of explosive) to achieve either ignition or detonation, this device can also function (with limitations) when the transmission line shock tube does not contain any explosive material. The limitation is that the output is only suitable for ignition transfer (not detonation) and the operational length of the transmission line may be decreased (but still operational over many feet).

Upon application of high voltage from a charged capacitor to the terminals of a device as is described above, the high current developed causes rapid heating, vaporization and the formation of plasma with the materials located between the conductors (metals, semiconductors, air, other gases or liquids etc). Since this reaction takes place extremely rapidly, a shock wave (noted by a sharp audible crack) is developed which propagates into the item 8 shock transmission tube, initiating the small amount of explosive material coated on its interior surface and thereby reinforcing the advancing shock wave. The item 9 target may be many feet from the point of electrical initiation and may consist of an igniter such as a rocket igniter containing various pyrotechnics, including $B/KNO_3$, $Al/KClO_4$, black powder, single or double base propellant, composite propellant or numerous other deflagrating materials. Alternately, the target may be an explosive charge that is to be detonated.

The device described (e.g. containing TLX or Nonel shock transmission tubing) may be used to directly initiate either an igniter material, an explosive, or an intermediate material such as ignition transmission line explosive, ITLX. The latter may be used to provide more sustained thermal output for ignition purposes.

TEST EXAMPLE #1

In example test #1, spark gap 5 of FIG. 1 is about 0.060 inch wide with the surface of the plastic between the posts coated with graphite. Air space 4 of FIG. 1 contains only air. Insulator 2 of FIG. 1 is a phenolic plastic plug for separating conductors; item 7 of FIG. 1 is a nylon retainer or spacer and item 8 is a Nonel transmission line shock transfer tube (12-inches long).

Figure 4:
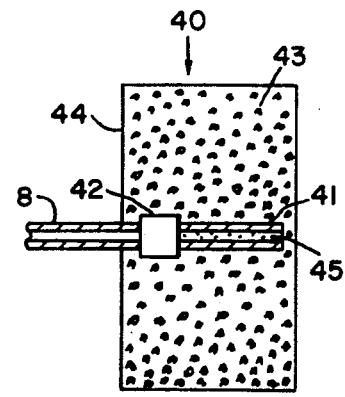
FIG. 4 depicts target 40 of test set up #2 wherein transmission line shock transfer tubing 8 is connected to ignition transfer tubing 41 with metal tube 42 for igniting igniter material 43 housed in container 44.

In further reference to FIG. 4, item 42 is a metal tube that provides means to splice the Nonel to ignition transfer tubing 41 (ITLX) (2-inches long). Igniter container 44 houses igniter material 43 which is an end item target main charge that can be initiated by this system.

In test #1, the conductor elements 1 are connected to about 8 ft of coaxial cable which in-turn is connected to a circuit containing a 1.0 microfarad capacitor charged to 2000 volts. Upon closing the circuit, there is a loud report, which is typical of Nonel actuation (by a squib or detonator). Examination of the residual hardware showed that the explosive material 45 in the ITLX had burned and ruptured its container, whereas the Nonel was intact. This is typical of the way these materials look when they are initiated with a squib. Therefore, the burned ITLX verifies that the electrical impulse causes a shock wave that is -propagated and is reinforced by the Nonel and of sufficient magnitude to initiate the ITLX. This test #1 was a complete success.

EXAMPLE #2

In test #2, everything was the same as in test #1 except that item 5, instead of being a spark gap, is a platinum bridgewire (1-mil diameter) soldered between the terminal posts. The electrical resistance of the assembly including 12 inches of wires was 0.80 ohms. This version of the concept has the advantage of having circuit continuity which lends itself to pretest checkout.

Upon actuation of the circuit firing switch, using the 1.0 microfarad capacitor and 2000 volts, there was a loud bang. Examination showed that the Nonel and ITLX were initiated, indicating 100% success in the two demonstration tests. The results show that one can use an electrically generated shock wave to initiate Nonel shock tube without the use of any pyrotechnics or explosives. Additionally, tests illustrate and verify the efficacy to shock initiation by the following elements or combinations thereof: (1) gap breakdown, (2) semiconductor bridge materials (graphite, silicon wafers etc ), or (3) wire filament vaporization embodiments can provide the shock initiation impulse. These combinations can also be used in series with resistors or spark gaps to achieve voltage holdoff or other effects.

As may be clear from the foregoing, maximum power supply/firing circuit efficiency, reliability and optimum packaging (low weight and volume) result when the electrical discharge element is close to or adjacent to the circuit containing the storage capacitor. This minimizes electrical transmission losses and the need for special cabling. Also, for maximum in-line safety the electrical discharge initiation element should be and can be separated from the end item target igniter or explosive charge. With this concept, the first element is chemically inert and therefore there is nothing to ignite or detonate and the second element of the system is nonelectric and therefore not vulnerable to electromagnetic radiation.

We claim:

1. A safe igniter and deflagration initiation system which comprises:
   (i) a firing circuit comprising a power source, a capacitor, switching means, and electrical connectings means for charging energy needed for said safe ordnance initiation system, said firing circuit providing a method for charging a storage capacitor to a preselected voltage and a means for rapidly and efficiently switching the charged capacity to an electrical discharge initiation element;
   (ii) an electrical discharge initiation element connected to said firing circuit, said electrical discharge initiation element providing the means of rapidly dissipating a capacitor charge and converting said capacitor charge to a shock wave and thermal/plasma energy output that propagates into and through an adjacent transmission line shock tubing, said electrical discharge initiation element comprising several components including a pair of electrical conductors, an insulator for separating said conductors, an air gap, a spark gap, and a case to provide structure support for several components and environmental protection for said air gap and said spark gap within said electrical discharge initiation element;
   (iii) a transmission line shock transfer tubing of a predetermined length and having a predetermined inner and outer diameter for receiving said shock and thermal/plasma energy output from said electrical discharge initiation element and transferring same to a target element, said transmission line shock transfer tubing connected to said electrical discharge initiation element at one end thereof and terminating in a target element at the other end thereof; and, (iv) a target element for interacting with a predetermined output energy level of shock charge and thermal/plasma energy transmitted through said transmission line shock transfer tube to achieve a desired result for igniting said target element.

2. The safe igniter and deflagration initiation system as disclosed in claim 1 wherein said electrical discharge initiation element comprises a spark gap in which two conductors are separated by an air gap.

3. The safe igniter and deflagration initiation system as disclosed in claim 1 wherein said transmission line shock transfer tubing terminates in said target element which is a rocket igniter and wherein said rocket igniter is selected from pyrotechnics of $B/KNO_3$ and $Al/KClO_4$, black powder, single or double base propellant, composite propellant, or deflagrating materials.

4. The safe igniter and deflagration initiation system as disclosed in claim 1 wherein said transmission line shock transfer tubing terminates in said target element which is an intermediate material of an ignition transmission line explosive.

5. The safe igniter and deflagration initiation system as disclosed in claim 4 wherein said ignition transmission line explosive terminates in a rocket igniter and wherein said rocket igniter is selected from pyrotechnics of $B/KNO_3$ and $Al/KClO_4$, black powder, single or double base propellant, composite propellant, or deflagrating materials.

* * * * *